June 26, 1945.  A. C. HOUGLAND ET AL  2,379,356

BUTTER WORKING MACHINE

Filed Dec. 2, 1942  2 Sheets-Sheet 1

Inventors
Albert C. Hougland
Glen S. Hougland
By John L. Stryker Jr.
Attorney

Inventors
Albert C. Hougland
Glen S. Hougland
By John E. Stryker jr.
Attorney

Patented June 26, 1945

2,379,356

UNITED STATES PATENT OFFICE 2,379,356

BUTTER WORKING MACHINE

Albert C. Hougland and Glen S. Hougland,
New York, N. Y.

Application December 2, 1942, Serial No. 467,611

6 Claims. (Cl. 31—35)

This invention relates to a butter working machine of the continuous type adapted to receive butterfat to be worked at one end and to discharge the worked butter automatically and continuously at the other end.

The principal object of our invention is to provide a novel butter working machine having the advantages of large capacity and low cost resulting from continuous operation.

The invention also includes certain novel features of construction which will be more fully pointed out in the following specification and claims.

Referring to the accompanying drawings which illustrate the best form of our invention at present known to us:

Fig. 6 is a diagrammatic plan view illustrating our angular adjustment of the central bar relative to the inner edge of a shelf.

Figure 1:
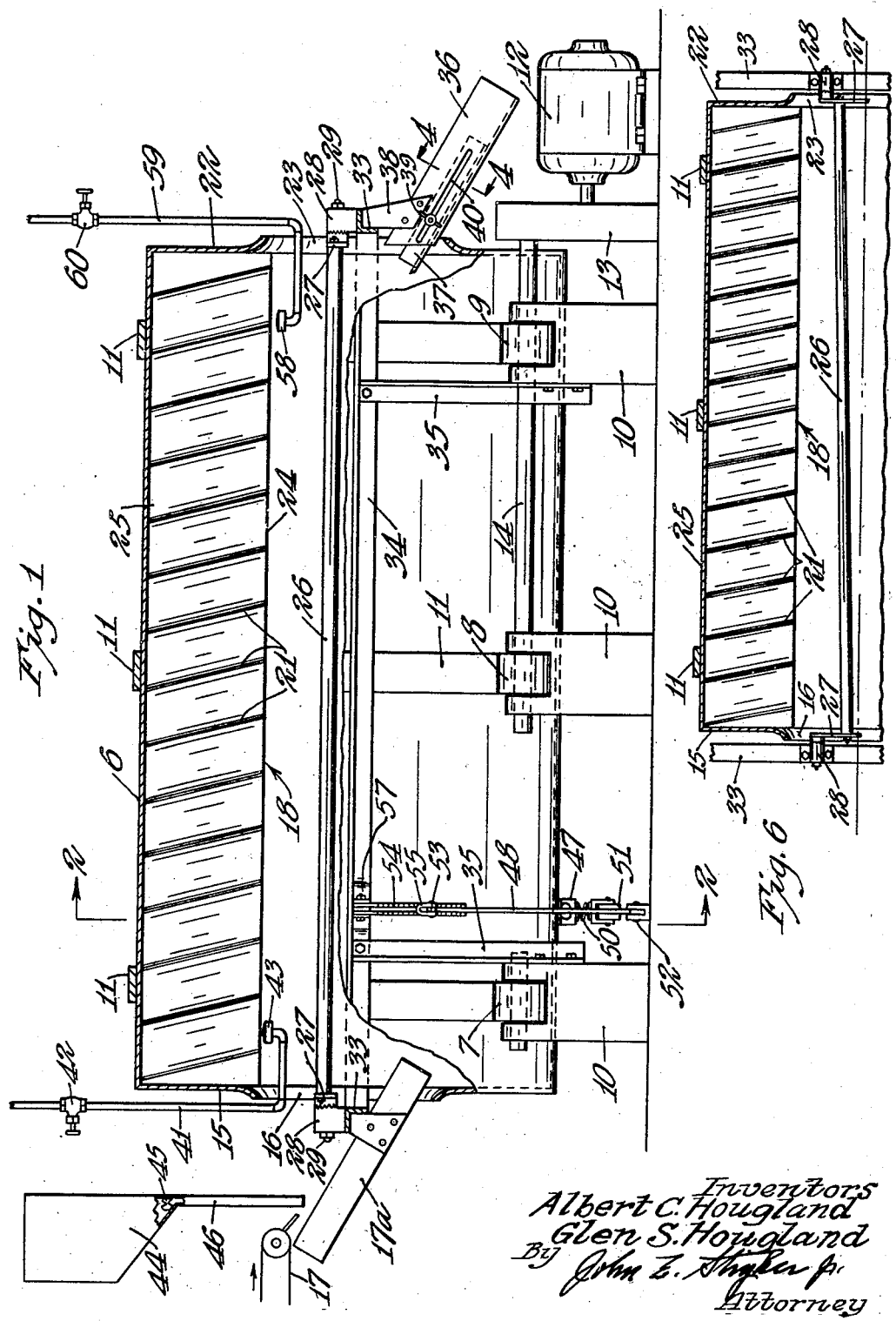
Figure 1 is a part side elevation and part vertical section showing our improved butter working machine.

Our improved machine has a cylindrical casing 6 which is adapted to be disposed with its axis approximately horizontal and supported for rotation about its axis on pairs of rollers 7, 8 and 9. Bearings for the rollers are mounted on base members 10. Mounted on the exterior of the casing 6 for rolling contact with the several pairs of rollers are circular tracks 11. Power for rotating the casing 6 is transmitted to a pair of the rollers 8 and 9 by suitable connections with a motor 12 comprising speed reducing gearing in a casing 13 and a shaft 14 on which the driving rollers 8 and 9 are fixed. An end wall 15 of the casing 6 is formed with a centrally located opening 16 into which the butter to be worked may be fed by a conveyor 17 and a chute 17a.

Figure 2:
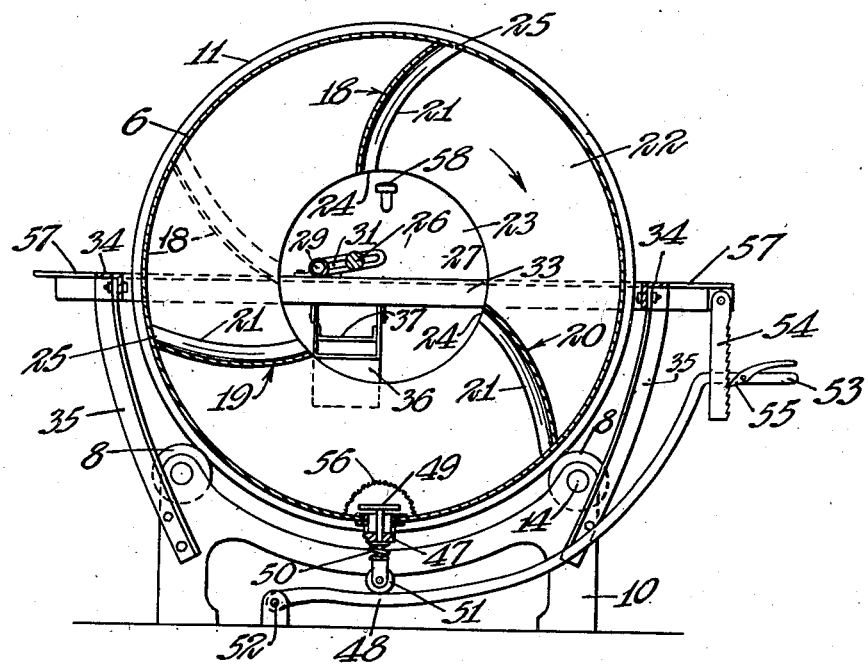
Fig. 2 is a cross section through the drum or casing taken on the line 2—2 of Fig. 1.
Figures 3, 5:
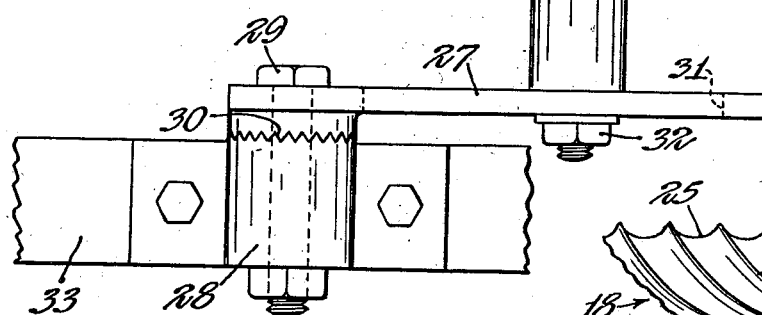
Fig. 3 is a plan view showing in detail one of the adjustable supports for the central bar.
Fig. 5 is a perspective view showing a fragmentary portion of one of the shelves.

Mounted within the casing 6 in equally spaced relation to each other around the periphery thereof are three butter working shelves indicated respectively by the numerals 18, 19 and 20. Each of these shelves extends the entire length of the casing and comprises a multiplicity of narrow, individual scoop members which are curved longitudinally and concave as viewed from their working faces (Fig. 5). As indicated in Fig. 1, ridges 21 along the side edges of the individual scoop members are parallel to each other and extend at a small acute angle relative to a plane which is perpendicular to the axis of the casing. By this construction the scoop members of the several shelves are caused to gradually advance the butter from the inlet end 15 to the outlet end 22 as the casing is rotated in the direction indicated by an arrow in Fig. 2. The end 22 of the casing is formed with a central opening 23 similar to the opening 16 in the end 15. For clarity the pitch or angle of the ridges 21 is somewhat exaggerated in Fig. 1. In practice, the rate of advance of the mass of butter toward the end 22 may be further controlled by slight inclination of the axis of the casing 6 in either direction.

The inner edges 24 of the several shelves 18, 19 and 20 extend in alignment with the openings 16 and 23 and the outer ends 25 of these shelves are fixed on the casing 6 so that the shelves are rigidly supported in spaced relation to each other around the periphery of the casing. As shown in Fig. 2, the outer edges 25 of the several shelves lead their inner edges 24 somewhat in the direction of rotation so that the scooping up of the butter from the bottom of the casing is facilitated and also in order to cause the load after having been picked up on a shelf to be discharged as the shelf reaches approximately the position indicated in dotted lines in Fig. 2.

Extending longitudinally within the casing 6 is an adjustable bar 26 for controlling the dropping of the load from the several shelves and its rate of movement longitudinally in the machine. This bar extends in from the end openings 16 and 23 and is supported at its ends respectively on arms 27. Each of these arms is mounted on a bracket 28 and bolt 29 so that the angle of the arm relative to the axis of the bolt 29 may be changed, the arm and bracket being formed with interlocked radial teeth 30 (Fig. 3) to retain the arm in adjusted positions. The bar 26 is also adjustable longitudinally of the supporting arms 27 which are each formed with an elongated slot 31 to receive a stud projecting from an end of the bar 26 and each stud being threaded to receive a clamping nut 32. Supports for the brackets 29 comprise horizontal frame members 33 extending parallel to the ends of the cylindrical casing and supported in turn on horizontal frame members 34 extending along opposite sides of the casing 6. Projecting upward from the base frame members 10 are a series of bars 35 which support the frame members 34.

Figure 4:
Fig. 4 is a cross section through the discharge chute taken on the line 4—4 of Fig. 1.

The worked butter is discharged from the cylindrical casing 6 on a chute member 36 having an extension 37 adapted to project in through the opening 23, as indicated in Fig. 1. The chute is suspended from the frame member 33 on a pair of arms 38 and, as shown in Fig. 4, the extension member 37 is adjustable longitudinally of the main chute member, wing bolts 39 being provided for connecting the members together and being adjustable longitudinally in slots 40 formed in the outer member 36. From the lower and outer end of the chute 36 the worked butter may be discharged into containers or onto a conveyor for carrying it to a packaging machine or for otherwise disposing of the product.

Water to be worked into the butter is supplied through a pipe 41 under control of a valve 42, the delivery end of the pipe 41 being provided with a spray head 43 near the inlet opening 16. Measured quantities of salt may also be supplied to the butter as it is fed into the chute 17a from a hopper 44 having a metering valve 45 to feed the salt through a delivery spout 46. Further control of the amount of water which is allowed to remain in the casing 6 is afforded by providing a drain valve 47. This valve is mounted on the periphery of the casing 6 between the shelves 19 and 20 and under control of a lever 48 extending beneath the casing 6. As best shown in Fig. 2, the valve has a head 49 which is normally spring pressed to closed position by a spring 50. A roller 51 is mounted on the outer end of the valve stem to make rolling contact with the upper surface of the cam lever 48 when the latter is elevated to operative position. One end of this lever has a pivotal support 52 and its other end is provided with a manually operable handle 53 and means for retaining the lever in various positions comprising a toothed rack 54 adapted to be engaged by a pawl 55. Within the casing 6 a guard screen 56 is mounted over the valve closure to guard against clogging and escape of butter through the valve 47. With the lever 48 in the path of the roller 51, the valve 47 is caused to be opened and retained in open position for a brief interval during each revolution of the casing 6. By lowering the lever 48 to a position where it is out of the path of the roller 51 the valve 47 may be retained in closed position.

To allow the valve and its operating mechanism, including the roller 51 to pass freely by the frame members 34, the latter are provided with U-shaped offset portions 57. Near the delivery end of the casing 6 a fine spray head 58 (Fig. 1) is arranged to be supplied with water under pressure through a pipe 59 under control of a valve 60. Water in the form of a fine mist is supplied by the head 58 to moisten the working surfaces of the shelves 18, 19 and 20 and thereby prevent sticking of the butter thereto. The continuous moistening of the shelves and casing walls is particularly important when these parts of the machine are constructed from stainless steel, plastics or other materials to which the butter has a tendency to stick.

Operation

In operation, the casing 6 is rotated about its horizontal axis by power applied through the rollers 8 and 9. Speeds of fifteen revolutions per minute, more or less, are ordinarily required for the butter working operation. Butter fat to be worked is fed at a controlled rate to the chute 17a by the conveyor 17 and, if salted butter is to be produced, a proportionate quantity of salt is continuously fed from the hopper 44 to the chute 17a while water to be worked into the butter is fed from the pipe 41 and nozzle 43. With the casing 6 rotating in the direction indicated by an arrow in Fig. 2, the butter fat as it falls from the chute 17a is picked up successively on the shelves 18, 19 and 20 and, after being carried part way up the left side of the casing, as viewed in Fig. 2, is rolled off of the first shelf and dropped between the bar 26 and inner edge of the shelf to the bottom of the machine in front of the succeeding shelf. This operation is repeated by the several shelves while the salt and water are worked into the butter and the mass is slowly advanced from the feeding end to the delivery end of the casing by the screw action of the ridges 21 on the shelves.

By adjusting the spacing and angular relation of the bar 26 relative to the inner edges of the several shelves, as they successively carry the load upward to the discharge position, we control the height from which the load is dropped and also the rate of advance of the butter toward the discharge chute. For example, the bar 26 may be fixed, as indicated in Fig. 6, at such acute angle to the shelves that it has a greater retarding effect on the butter near the outlet end of the casing than it has near the inlet end, thus retaining the mass in the machine for a longer period of time and also causing the mass to be lifted to a greater height near the discharge end. All such adjustments may be made while the machine is in operation. The speed of rotation of the casing is coordinated with the adjustment of the bar and rate of feed of butter fat to the machine so that the latter rate is equal to the rate of advance of the elongated mass of butter toward the outlet opening 23 in the machine. By the time it has reached this delivery end of the casing the butter has acquired the desired waxy consistency and has the desired proportion of water and salt worked into it.

During each revolution of the casing 6 the butter is dropped from each of the shelves, the resulting impact producing the desired mixing and concussion effect. As it falls from the ends of the shelves immediately adjoining the opening 23, a quantity of the butter is caught on the inner end of the chute member 37 and is carried out of the revolving casing thereon. The rate of discharge is controlled and coordinated with the longitudinal movement by adjustment of the position of the member 37 relative to the main chute member 36. Control of the moisture content of the butter is facilitated by our arrangement for allowing the escape of controlled quantities of water from the casing through the valve 47. If the butter tends to take up an excessive amount of moisture, the cam lever 48 is merely set in a raised position so that upon each revolution of the casing 6, the valve 47 is opened momentarily to permit the escape of the excess water, the degree of opening being controlled by the position of the pawl 55 in engagement with the rack 54.

We prefer to construct the entire butter working machine from metal and the several parts which come in contact with the butter from stainless steel or a suitable plastic material. This promotes sanitation by making it feasible to thoroughly sterilize the interior surfaces of the machine by the use of hot water or steam at temperatures above those which may be used with ordinary wooden butter working machines. The operation of our improved machine being continuous, it may be operated to increase the daily production of butter and it requires less labor and fewer interruptions in its operation, as compared with butter workers of the batch type. Our machine may be used to best advantage in connection with a continuously operating churn, such as that described and claimed in our co-pending application, Serial No. 467,610, filed December 2, 1942, where such churn is designed to produce butter at a rate within the capacity of the butter working machine or at approximately the same rate as the latter.

Having described our invention, what we claim as new and desire to protect by Letters Patent is:

1. A butter working machine having in combination a revoluble drum disposed with its axis of rotation substantially horizontal, means for feeding butter fat to be worked continuously and at a controlled rate into one end of said drum, means for discharging worked butter continuously from the other end of said drum, means for rotating said drum, a shelf extending substantially longitudinally within said drum to lift and drop an elongated mass of butter therein, a multiplicity of spaced projecting members extending crosswise of the working face of said shelf and at such acute angles to the axis of rotation of the drum as to advance the mass of butter toward said discharge means under the rotary motion of the drum and means for retarding the advance of the butter toward said discharge means comprising a bar extending along the inner edge of said shelf in the path of the butter and means for adjusting the spacing and angle of said bar relative to the shelf.

2. A butter working machine having in combination a drum having an axis of rotation disposed substantially horizontally, means for feeding butter fat to be worked into one end of said drum, means for discharging worked butter from the other end thereof, means for rotating said drum about its axis, a shelf extending longitudinally within said drum to lift and drop a mass of butter therein, means for advancing said mass longitudinally of the drum toward one end thereof, a bar extending in spaced relation to the inner edge of said shelf to retard the falling of the butter therefrom and means for changing the spacing and angle of said bar relative to the shelf to control the rate of longitudinal advance of the butter.

3. A butter working machine having in combination a cylindrical casing disposed with its axis substantially horizontal and adapted to be rotated about its axis, the end walls of said casing being formed with centrally located openings, means for feeding butter fat to be worked into one of said end openings, means for rotating said casing about its axis, a shelf extending longitudinally within said casing to lift and drop a mass of butter therein, means for advancing said mass longitudinally of the casing toward the discharge end opening, a bar supported exteriorly of said casing and extending in through said openings and in spaced relation to the inner edge of said shelf to retard the butter thereon and means accessible from the exterior of the casing for adjusting the position of said bar relative to the inner edge of said shelf.

4. A butter working machine having in combination a revoluble drum, means for rotating said drum, a shelf extending substantially longitudinally within said drum to lift and drop a mass of butter therein, means for advancing said mass of butter longitudinally of the drum toward an end thereof while said mass is dropped repeatedly from the inner edge of said shelf and means for continuously depositing a fine mist of water on the surfaces of the drum and shelf to guard against the sticking of the butter on said surface.

5. A butter working machine having in combination a revoluble drum disposed with its axis of rotation substantially horizontal, means for continuously feeding butter fat to be worked into one end of said drum, a discharge opening being formed in the opposite end of said drum, means for rotating said drum, a shelf extending substantially longitudinally within said drum to support an elongated mass of butter therein, means for advancing the mass of butter toward said discharge opening under the rotary motion of the drum, means for discharging end portions of said mass through said opening and means for continuously supplying and maintaining an atmosphere of fine mist within the drum whereby the working surfaces of said shelf and drum are maintained in a moistened condition to guard against the adherence of butter thereto.

6. A butter working machine having in combination a revoluble container, means for rotating said container, a shelf extending within said container to support and lift a mass of butter therein and whereby a mass of butter is alternately lifted and dropped while the container is rotated and means for continuously supplying and maintaining an atmosphere of mist within the container whereby a film of moisture is replaced on the working surfaces of said shelf and container after each contact with the butter to guard against the adherence of butter to said surfaces.

ALBERT C. HOUGLAND.
GLEN S. HOUGLAND.